US008773945B1

(12) United States Patent
Keith et al.

(10) Patent No.: US 8,773,945 B1
(45) Date of Patent: Jul. 8, 2014

(54) APPARATUS FOR TURBULENT BOUNDARY LAYER CONTROL AND FLOW NOISE REDUCTION

(71) Applicants: William L Keith, Ashaway, RI (US); Alia W Foley, Middletown, RI (US)

(72) Inventors: William L Keith, Ashaway, RI (US); Alia W Foley, Middletown, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 13/799,171

(22) Filed: Mar. 13, 2013

(51) Int. Cl.
G01S 15/02 (2006.01)

(52) U.S. Cl.
CPC .................................. G01S 15/02 (2013.01)
USPC ............................................................ 367/1

(58) Field of Classification Search
USPC ........................................................ 367/1, 901
See application file for complete search history.

(56) References Cited

U.S. PATENT DOCUMENTS 8,576,666 B1 * 11/2013 Foley et al. ................... 367/131

* cited by examiner

Primary Examiner — Daniel Pihulic
(74) Attorney, Agent, or Firm — James M. Kasischke; Michael P. Stanley

(57) ABSTRACT

An assembly is provided for determining a parametric design of a large eddy breakup device in which the assembly comprises a water tunnel turbulent pipe flow section; a large eddy breakup device ring disposed within the pipe flow section; and a wall pressure sensor array operable to detect wall pressure in the turbulent pipe flow section. Energy in a wavenumber frequency spectra of wall pressure fluctuations is redistributed via changes to the parametric design in order to minimize turbulent wall pressure fluctuations with the result of reduced flow noise and drag.

5 Claims, 4 Drawing Sheets

APPARATUS FOR TURBULENT BOUNDARY LAYER CONTROL AND FLOW NOISE REDUCTION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to sonar noise reduction. More particularly, the present invention relates to an apparatus and method of use for the passive control of flow noise from flow-induced vibration of sonar systems.

(2) Description of the Prior Art

Currently, hull-mounted and towed arrays are subject to flow noise due to turbulent wall pressure fluctuations on the arrays. Flow noise can mask an acoustic signal with the result of reducing the effectiveness of the sonar.

A primary source of flow noise is the turbulent wall pressure fluctuations on hull mounted and towed arrays at most operational speeds due to high Reynolds numbers involved. Particular methods shown to be effective for drag and flow noise reduction include riblets, large eddy breakup devices (LEBU) and the use of polymers. Since turbulent wall pressure fluctuations have been shown to scale on the mean wall shear stress; methods which lead to skin friction drag reduction would be expected to also lead to flow noise reduction. Also, methods which result in a redistribution of energy in the wavenumber frequency spectra of wall pressure fluctuations are important for reduction in direct flow noise and flow induced vibration. The low wavenumber region is of particular importance. To date, this level of control has not been widely achieved.

The implementation of turbulence control technology is closely related to the complexity and cost of execution. In particular, the control methods can be broken down into active and passive. Passive techniques are generally easier to use and less expensive.

The injection of a polymer into the turbulent boundary layer is a proven method of significant drag reduction. While this technique may work for flow noise reduction, implementation of polymer injection involves a major impact to the hull and the environment. In addition, use of this technique is constrained by the volume of polymer which can feasibly be carried onboard a vessel.

Riblets have been shown to produce a 5-10% reduction in drag and have a small effect on wall pressure fluctuations. However, it seems unlikely that riblets would be able to achieve the objectives of the present invention. Electromagnetic turbulence control is another candidate for achieving redistribution of energy. However, the cost, complexity and ship impact of implementation is excessive in comparison to the use of a LEBU.

SUMMARY OF THE INVENTION

Accordingly, it is an object of the present invention to provide an assembly for passive control of flow noise and flow-induced vibration on sonar systems.

Another object of the present invention is to provide a assembly for improving sonar performance over a range of operational speeds with a reduction in drag.

In accordance with the present invention, an assembly is provided for determining a parametric design of a large eddy breakup device (LEBU) in which the assembly comprises a water tunnel turbulent pipe flow section; a LEBU ring disposed within the turbulent pipe flow section; and a wall pressure sensor array operable to detect wall pressure in the turbulent pipe flow section; wherein energy in a wavenumber frequency spectra of wall pressure fluctuations is redistributed via changes to the parametric design in order to minimize turbulent wall pressure fluctuations.

In accordance with another embodiment, a method is provided for redistributing energy in a wavenumber frequency spectra of wall pressure fluctuations in a sonar array in which the method comprises the steps of: changing a parametric design of a large eddy breakup device; affecting dropouts in the wavenumber frequency spectra at a low wavenumber region thereof; and reducing direct flow noise and flow induced vibration. The primary design parameters are the distance of the LEBU from the solid wall and geometry of the LEBU itself (different classical airfoil designs as well as simple rectangular geometries are possible).

In accordance with a further embodiment, a method for passively controlling flow noise and flow-induced vibrations in a sonar system comprises the steps of: redistributing energy in a wavenumber frequency spectra of wall pressure fluctuations in the sonar system; providing a large eddy breakup device with an improved design; and creating a dropout in the wavenumber frequency spectra at a low wavenumber region.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawing and wherein.

DETAILED DESCRIPTION OF THE INVENTION

Figure 1:
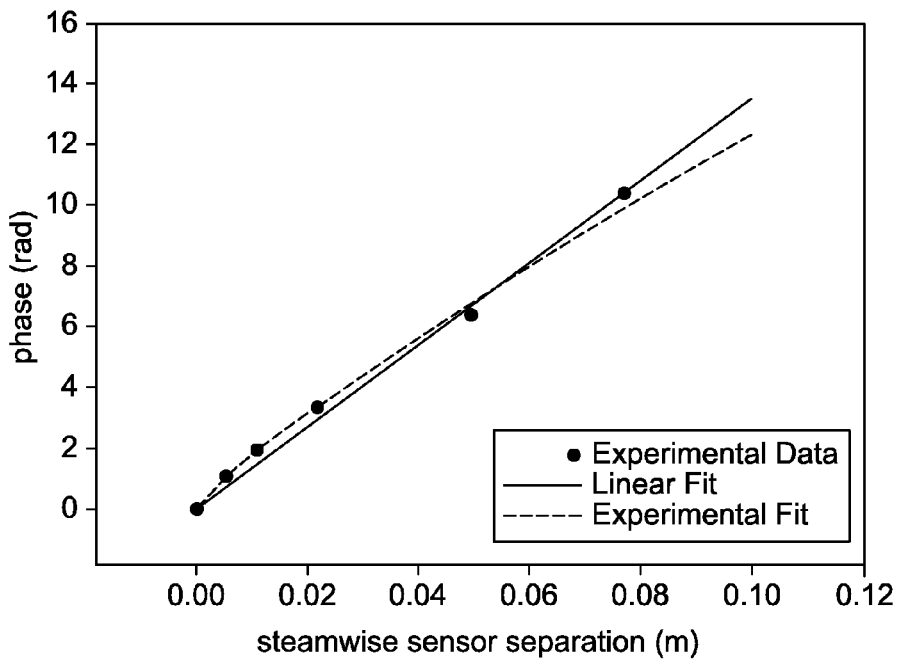
FIG. 1 is a graph depicting a curve fitting to a measured phase shift between sensors.
Figure 2:
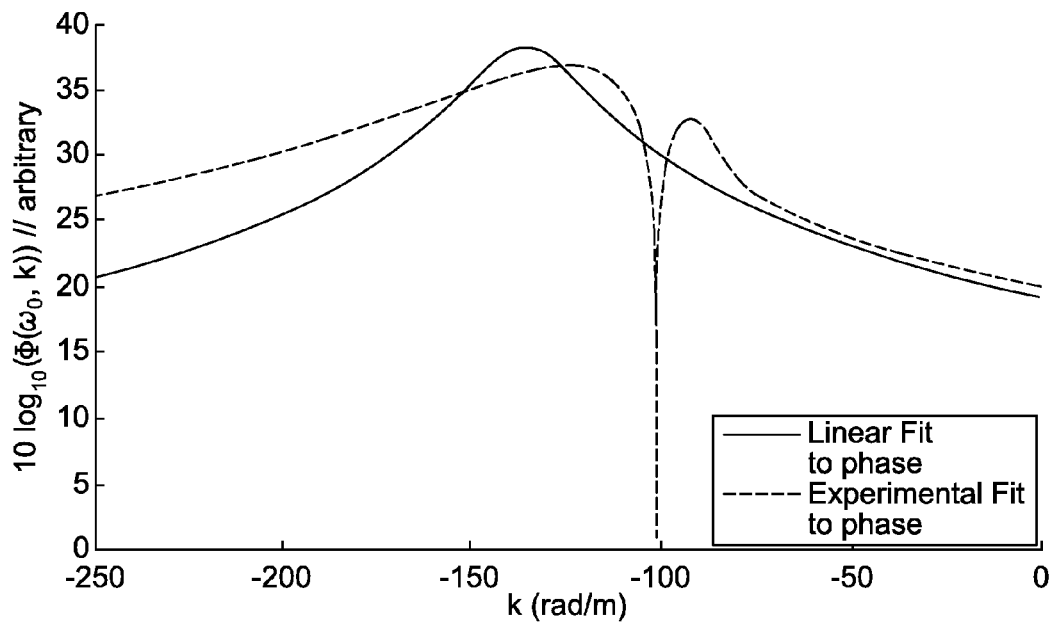
FIG. 2 is a graph depicting a wavenumber frequency spectra estimated from cross-spectral measurements.

Referring now to the drawings, and more particularly to FIG. 1 and FIG. 2, for a particular frequency $\omega_0$, the wavenumber-frequency spectrum $\Phi(\omega_0, k)$, is related to the cross-spectrum, $G(\omega_0, \xi)$, by $$\Phi(\omega 0,k)=1/2\pi \int_{-\infty}^{\infty} G(\omega 0,\xi)e^{-ik\xi}d\xi. \tag{1}$$

To estimate $\Phi(\omega_0, k)$ from Equation (1), the magnitude and phase of $G(\omega_0, \xi)$ must be established. Curve fits were made to the magnitude and phase of cross spectral data taken during a towed array tow tank test. Subtle changes in the curve fits to the phase (FIG. 1) resulted in substantial changes to the computed wavenumber spectrum (FIG. 2) at a fixed frequency $\omega_0$ at which the turbulent energy was dominated by direct turbulent boundary layer wall pressure fluctuations. From the same data set, the direct measurement of wavenumber frequency spectra showed variations in spectral levels in low wavenumbers. These variations could result from the phase shift mechanism. There is uncertainty as to whether these dropouts or nulls are artifacts of the curve fitting; however, the extreme sensitivity to very small changes in the phase suggests that the dropouts are real. In particular, if the dropouts do not exist in an equilibrium boundary layer; the boundary layer can be perturbed in a subtle manner to generate the dropouts. Proof of this phenomenon requires a highly controlled experiment in which such minute alterations in the phase relationships between sensors can be achieved and the effects of these changes measured. Such an experiment is described herein.

A solution which overcomes the inherent difficulties and uncertainties in accurately determining sensor phase would be to make measurements with a wall pressure sensor array in a turbulent water tunnel test section. An active acoustic source in the test section which would "appear" and "disappear" in the measurement as the sensor phase relationships are altered such that a less refined measurement be acceptable.

Figure 3:
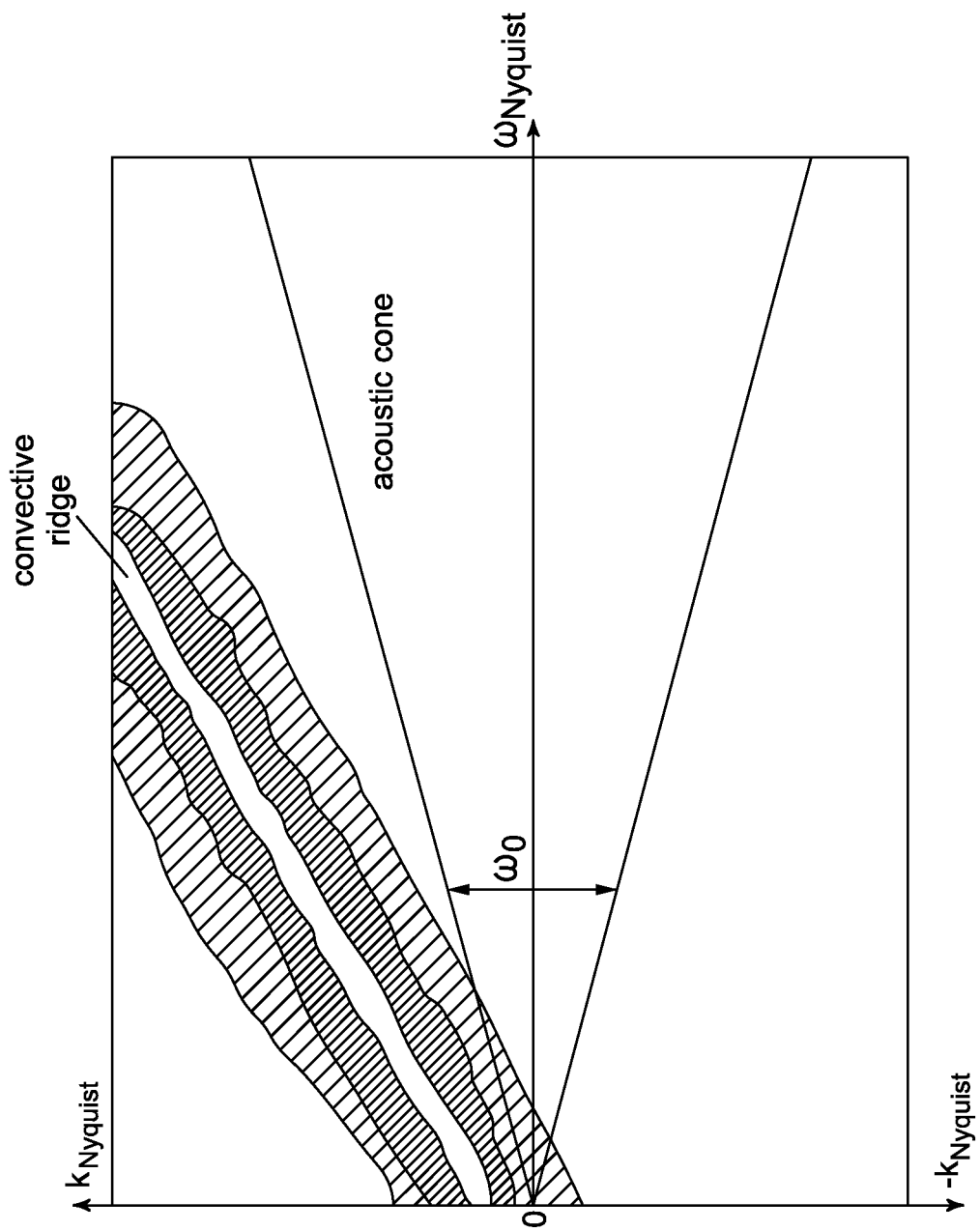
FIG. 3 depicts qualitative features of a wavenumber frequency spectrum.
Figure 4:
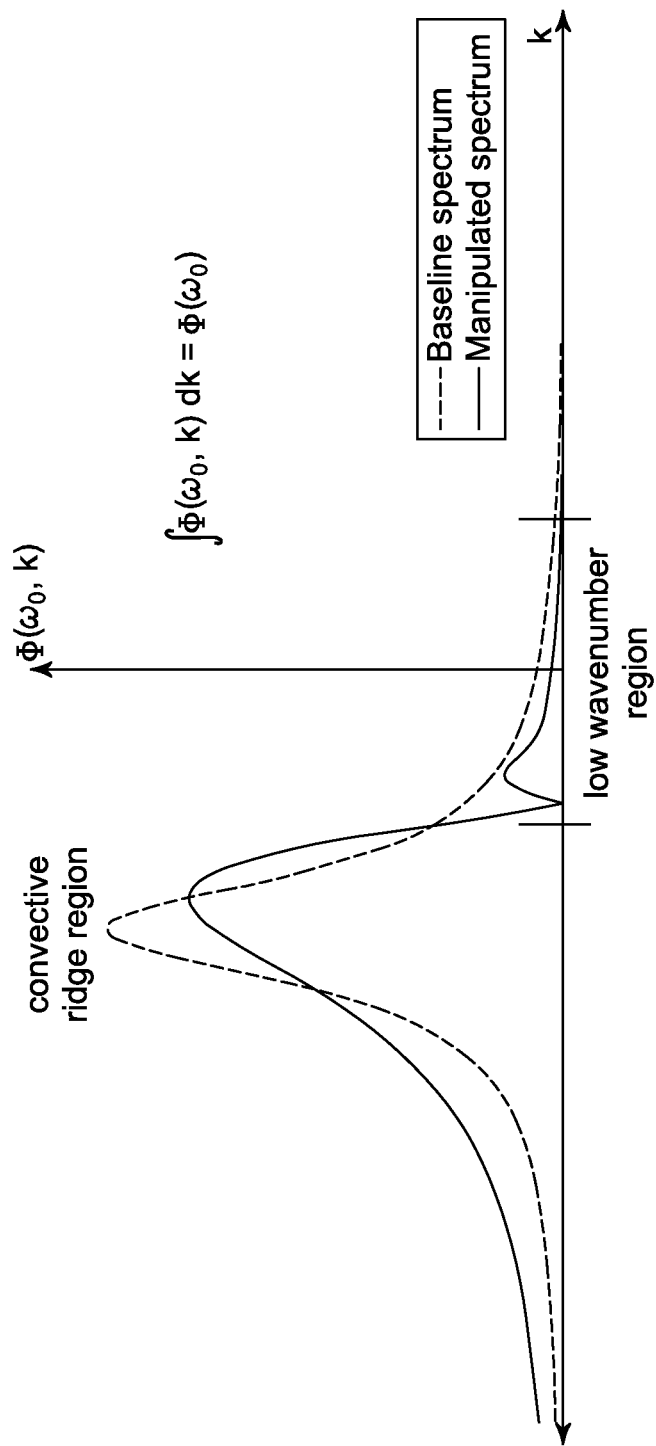
FIG. 4 depicts qualitative features of the distribution of energy in wavenumber at a fixed frequency; thereby, demonstrating a null introduced in the low wavenumber region of the energy spectrum.

Referring now to FIG. 3 and FIG. 4, the use of LEBUs cause a redistribution of energy in streamwise wavenumber "k" at any desired frequency $\omega_0$. The wall pressure fluctuations downstream of the LEBU (mounted in an acoustically quiet water tunnel) can be measured. Changes in the cross spectra resulting from the interaction of the LEBU with the turbulence were observed. The desired change in the spectral distribution of turbulent energy is a reduction or possibly a null within the acoustic cone or low wavenumber region.

Implementation of turbulent boundary layer control to reduce flow noise requires a detailed parametric study involving the following: cross-sectional shape of the LEBU; location of the LEBU in the turbulent boundary layer; and consideration of the Reynolds number.

Figure 5:
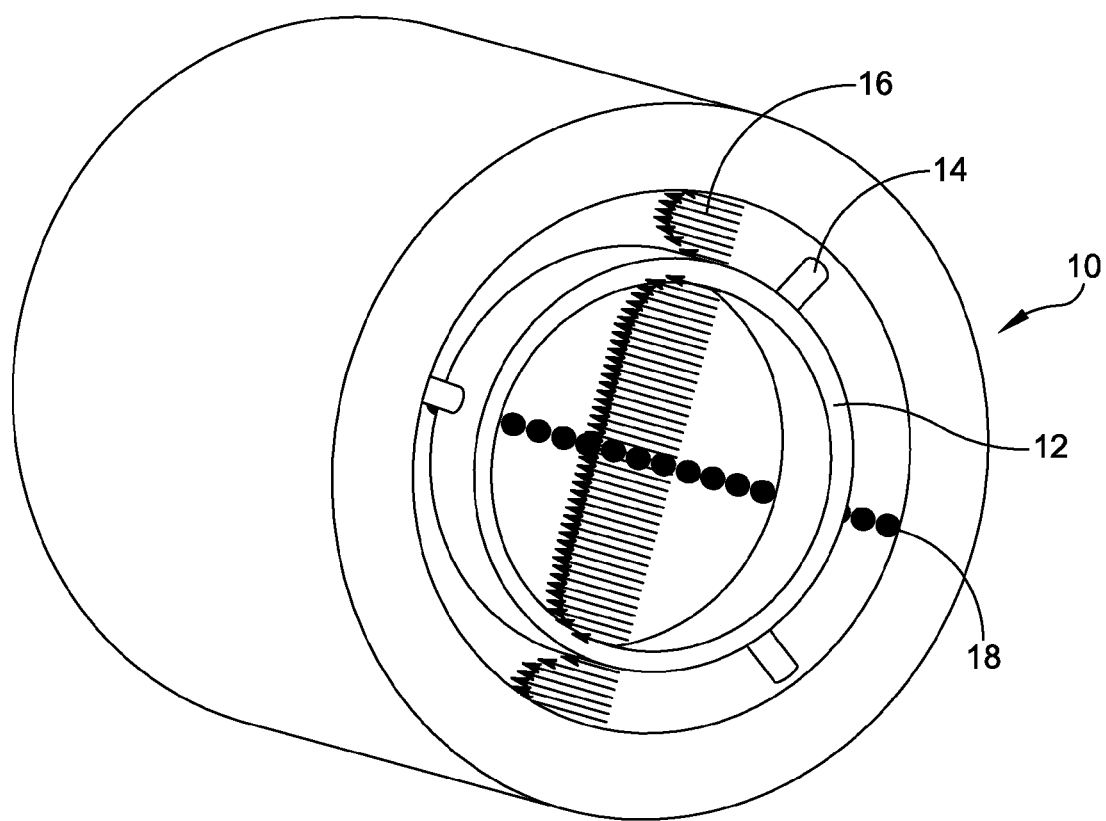
FIG. 5 is a schematic representation of a large eddy breakup device mounted in a fully developed pipe flow test section to depict proof-of-concept of a flow noise reduction assembly of the present invention.

Referring to FIG. 5, such a parametric study can be accomplished using a pipe flow assembly 10 (for example: a 3.5" inner diameter assembly) such that a LEBU ring 12 is supported by a plurality of ring struts 14 could be mounted in the boundary layer and a resulting perturbed wall pressure field 16—directly measured by a wall pressure sensor array 18 which extends upstream and downstream of the LEBU ring.

The wall pressure field is related to the velocity profile shown in FIG. 3. The goal is to establish the important parameters and the relationships between these parameters and the desired changes in the pressure field. In the case of the use of LEBUs for drag reduction; a primary design consideration is device drag. For the present invention, drag is not of particular interest; however, the device would have to be designed to avoid structural radiated noise. It is also may be possible to achieve redistribution of energy in wavenumber without changing the related auto-spectral level.

The noise reduction assembly of the present invention can be used in various applications, such as hull-mounted arrays on submarines, surface ships, unmanned underwater vehicles or torpedoes, and possibly towed arrays. The technology of the present invention is a passive solution with the result of constituting a minimal structural and hydrodynamic impact on a ship hull.

The assembly and method of use of the assembly of the present invention provide several advantages and features that include improved passive sonar performance, reduced drag due to skin friction, reduced radiated noise, possible improved sonar performance during ship maneuvers, low cost relative to alternatives, and reduced radiated noise in pipe flows.

The assembly and method of use of the assembly of the present invention also provide the ability to redistribute energy through parametric design. Designs which would potentially lead to flow noise improvements might not lead to drag reduction; the optimum design cannot be designed a priori without parametric testing.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An assembly for determining a parametric design of a large eddy breakup device, said assembly comprising:
    a water tunnel turbulent pipe flow section;
    a large eddy breakup ring disposed within said water tunnel turbulent pipe flow section; and
    a wall pressure sensor array operable to detect wall pressure in a wall of said pipe flow section;
    wherein energy in a wavenumber frequency spectra of wall pressure fluctuations is redistributed via changes to the parametric design to minimize turbulent wall pressure fluctuations.

2. The assembly of claim 1, wherein said wall pressure sensor array extends upstream and downstream of said ring.

3. The assembly of claim 1, wherein the changes to the parametric design include at least one of a cross-sectional shape of the large eddy breakup and a location of the large eddy breakup in a turbulent boundary layer.

4. A method for reducing direct flow noise and flow induced vibration in a sonar array, said method comprising the steps of:
    changing a parametric design of a large eddy breakup device;
    affecting dropouts in the wavenumber frequency spectra at a low wavenumber region thereof; and
    reducing direct flow noise and flow induced vibration through changes in the parametric design.

5. The method of claim 4, wherein the changes to the parametric design include at least one of a cross-sectional shape of the large eddy breakup and a location of the large eddy breakup in a turbulent boundary layer.

* * * * *